(12) United States Patent
Medvinsky et al.

(10) Patent No.: US 8,364,964 B2
(45) Date of Patent: Jan. 29, 2013

(54) REGISTERING CLIENT DEVICES WITH A REGISTRATION SERVER

(75) Inventors: Alexander Medvinsky, San Diego, CA (US); Paul Moroney, Olivenhain, CA (US); Jiang Zhang, La Jolla, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 12/648,416

(22) Filed: Dec. 29, 2009

(65) Prior Publication Data
US 2011/0158411 A1 Jun. 30, 2011

(51) Int. Cl.
*H04L 9/14* (2006.01)
*H04L 9/28* (2006.01)
*H04L 9/08* (2006.01)

(52) U.S. Cl. ........ 713/171; 713/163; 713/175; 713/176; 380/259; 380/279

(58) Field of Classification Search ................. None
See application file for complete search history.

(56) References Cited

U.S. PATENT DOCUMENTS

| | | | | |
|---|---|---|---|---|
| 6,091,820 | A * | 7/2000 | Aziz | 380/30 |
| 6,240,187 | B1 * | 5/2001 | Lewis | 380/282 |
| 6,510,519 | B2 * | 1/2003 | Wasilewski et al. | 713/168 |
| 6,886,095 | B1 * | 4/2005 | Hind et al. | 713/168 |
| 7,260,721 | B2 * | 8/2007 | Tanaka et al. | 713/170 |
| 7,933,410 | B2 * | 4/2011 | Fahrny | 380/201 |
| 2002/0114466 | A1 * | 8/2002 | Tanaka et al. | 380/232 |
| 2002/0165912 | A1 * | 11/2002 | Wenocur et al. | 709/203 |
| 2003/0159033 | A1 * | 8/2003 | Ishiguro | 713/156 |
| 2003/0182236 | A1 * | 9/2003 | Tanaka et al. | 705/51 |
| 2006/0184796 | A1 * | 8/2006 | Fahrny | 713/176 |
| 2006/0235801 | A1 * | 10/2006 | Strom et al. | 705/59 |
| 2007/0044159 | A1 * | 2/2007 | Ishiguro | 726/27 |
| 2007/0083766 | A1 * | 4/2007 | Farnham et al. | 713/176 |
| 2007/0289025 | A1 * | 12/2007 | Tanaka et al. | 726/28 |
| 2007/0300310 | A1 * | 12/2007 | Molaro | 726/29 |
| 2008/0031448 | A1 * | 2/2008 | Dang et al. | 380/200 |
| 2010/0088515 | A1 * | 4/2010 | Nishimoto et al. | 713/168 |

OTHER PUBLICATIONS

"Diffie-Hellman Protocol" http://mathworld.wolfram.com/Difie-HellmanProtocol.html.*
Zhao, Xin, et al, "Design and Implementation of Hybrid Broadcast Authentication Protocols in Wireless Sensor Networks", International Journal of Advanced Science and Technology, vol. 2, Jan. 2009.*
Digital Video Broadcasting (DVB); "IP Datacast over DVB-H: Service Purchase and Protection" ETSI TS 102474, v.1.3.1, 2009.

(Continued)

*Primary Examiner* — Christopher Revak
(74) *Attorney, Agent, or Firm* — Susan R. Payne (57) ABSTRACT

In a method of registering a plurality of client devices with a device registration server for secure data communications, a unique symmetric key is generated for each of the client devices using a cryptographic function on a private key of the device registration server and a respective public key of each of the client devices, and a broadcast message containing the public key of the device registration server is sent to the client devices, in which the client devices are configured to generate a respective unique symmetric key from the public key of the device registration server and its own private key using a cryptographic function, and in which the unique symmetric key generated by each client device matches the respective unique symmetric key generated by the device registration server for the respective client device.

18 Claims, 6 Drawing Sheets

OTHER PUBLICATIONS

Moroney, Paul; "Motorola Conditional Access System for Mobile TV", Motorola Mobile TV Center, San Diego, CA, 2005.
Moroney, Paul; "Motorola NewCipher CA System Overview", Motorola Home and Networks Mobility Business, May 9, 2008.
Song, Jh, et al., "The AES-CMAC Algorithm", The Internet Society, Jun. 2006.
Chung, et al., "DHB-Key: An Efficient Key Distribution Scheme for Wireless Sensor Networks", InfoLab21, Lancaster University, UK, 2008.
Yeh, et al., "A Secured Authentication Protocol for Wireless Sensor Networks Using Elliptic Curves Cryptography", Open Access Sensors, May 2, 2011.

* cited by examiner

REGISTERING CLIENT DEVICES WITH A REGISTRATION SERVER

RELATED APPLICATION

The present application contains some common subject matter with U.S. patent application Ser. No. 12/468,839, entitled "Providing Access To Content For A Device Using An Entitlement Control Message", filed on May 19, 2009 by Paul Moroney, Petr Peterka, and Jiang Zhang, the disclosure of which is incorporated by reference in its entirety.

BACKGROUND

Key management systems typically employ messages known as entitlement control messages (ECMs) and entitlement management messages (EMMs) to control access to data streams. In a conditional access system, each content stream is associated with a stream of ECMs that serves two basic functions: (1) to specify the access requirements for the associated content stream; and (2) to convey the information needed by subscriber devices to compute the cryptographic key(s), which are needed for content reception. ECMs are transmitted in-band alongside their associated content streams. EMMs are control messages that convey access privileges and keys to subscriber devices. Unlike ECMs, which are embedded in transport multiplexes and are broadcast to multiple subscribers, EMMs are typically sent unicast-addressed to each subscriber device. That is, an EMM is specific to a particular subscriber.

For improved scalability and security, devices have been authenticated using public keys and digital certificates. Typically, for instance, in response to a compromise in the symmetric device keys, a device registration server individually sends every single device, a device registration message giving a new symmetric key protected under the public key. However, this individual communication of device registration message consumes a great deal of time as well as bandwidth. The bandwidth consumption is often problematic in many conditional access systems, such as for mobile TV and portable video players, which have very little available bandwidth. In addition, the bandwidth overhead required to individually communicate the device registration message to the devices is typically overly burdensome on the broadcast network, particularly as they must typically be repeated several times to ensure reliable reception.

SUMMARY

Disclosed herein is a method of registering a plurality of client devices with a device registration server for secure data communications. In the method, a unique symmetric key is generated for each of the plurality of client devices using a cryptographic function on a private key of the device registration server and the respective public key of each of the plurality of client devices. In addition, a broadcast message containing the public key of the device registration server is sent to the plurality of client devices, in which each of the plurality of client devices is configured to generate a respective unique symmetric key from the public key of the device registration server and its own private key using a cryptographic function, and in which each of the unique symmetric keys generated by the plurality of client devices matches the respective key generated by the device registration server for the respective client device.

Also disclosed herein is a device registration server configured to provide registration for a plurality of client devices associated with respective public keys. The device registration server includes one or more modules configured to generate a unique symmetric key for each of the plurality of client devices using a cryptographic function on a private key of the device registration server and the respective public key of each of the plurality of client devices, and to send a broadcast message containing a public key of the device registration server to each of the plurality of client devices, in which each of the unique symmetric keys matches a respective unique symmetric key generated in each of the plurality of client devices. The device registration server also includes a processor configured to implement the one or more modules.

Further disclosed is a client device configured to become registered with a device registration server having a public key. The client device includes one or more modules configured to receive a broadcast message containing the public key of the device registration server sent by the device registration server, to store the public key of the device registration server and to generate a unique symmetric key using a cryptographic function on a private key of the client device and the public key of device registration server, wherein the generated unique symmetric key matches a unique symmetric key generated in the device registration server for the client device. The client device also includes a processor configured to implement the one or more modules and a data store for at least temporarily storing the public key of the device registration server and the generated unique symmetric key.

Further disclosed herein is a computer readable storage medium on which is embedded one or more computer programs, the one or more computer programs implementing the method of registering a plurality of client devices with a device registration server discussed above.

Through implementation of the method, device registration server, and client device disclosed herein, the amount of bandwidth required to communicate a device registration message to a plurality of devices in a network is substantially reduced as compared with conventional approaches. More particularly, the device registration server generates unique symmetric keys for each of the client devices without using the private keys of client devices, and the client devices generate respective unique symmetric keys that match the respective unique symmetric keys generated by the device registration server for the client devices, without using the private key of the device registration server. In one regard, therefore, the device registration server need only send a single common broadcast message to all of the client devices containing the server public key whenever a change in the client unique symmetric keys is required, such as, when security in the network has been compromised. One result of this ability is that the device registration server is not required to consume processing power to generate individual messages for each of the client devices. Another result is that the device registration server may send the common broadcast messages to the client devices, without consuming the relatively large amounts of bandwidth required for sending individual messages.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Figure 1:
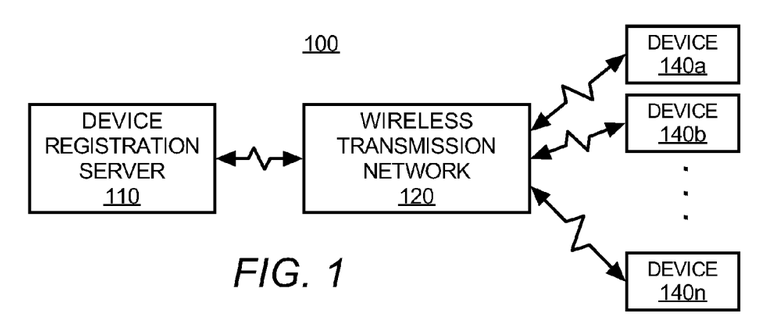
FIG. 1 illustrates a block diagram of a device registration system, according to an embodiment of the invention.

With reference first to FIG. 1, there is shown a block diagram of a device registration system 100 including a wireless transmission network 120, according to an embodiment of the present invention. It should be apparent to those of ordinary skill in the art that the block diagram of FIG. 1 represents a generalized illustration and that other components may be added or existing components may be removed, modified or rearranged without departing from a scope of the device registration system 100.

The system 100 includes a device registration server 110 and a wireless transmission network 120, such as a Wireless Wide Area Network (WWAN), WiMax, 3GPP, terrestrial or a satellite transmission network. The system 100 also includes a plurality of client devices 140a-140n to be registered with the device registration server 110 via the wireless transmission network 120.

The client devices 140a-140n generally refer to Conditional Access System (CAS) clients capable of receiving content, such as, set-top boxes (cable, satellite or IP STBs), CATV, satellite-TV, mobile handsets, and portable media players, computing devices, software or applications stored on a personal computer or another computing device, etc. The client devices 140a-140n may each be operable as either a stand-alone unit (e.g., an STB) or an integral part of a content-viewing device, such as a television with a built-in satellite or CATV receiver, and/or software stored on any of these devices. In any regard, and as discussed in greater detail herein below, the client devices 140a-140n are configured to become registered with the device registration server 110 for data communications without requiring that the private keys of either of the client devices 140a-140n or the device registration server 110 be communicated to each other.

Figure 2:
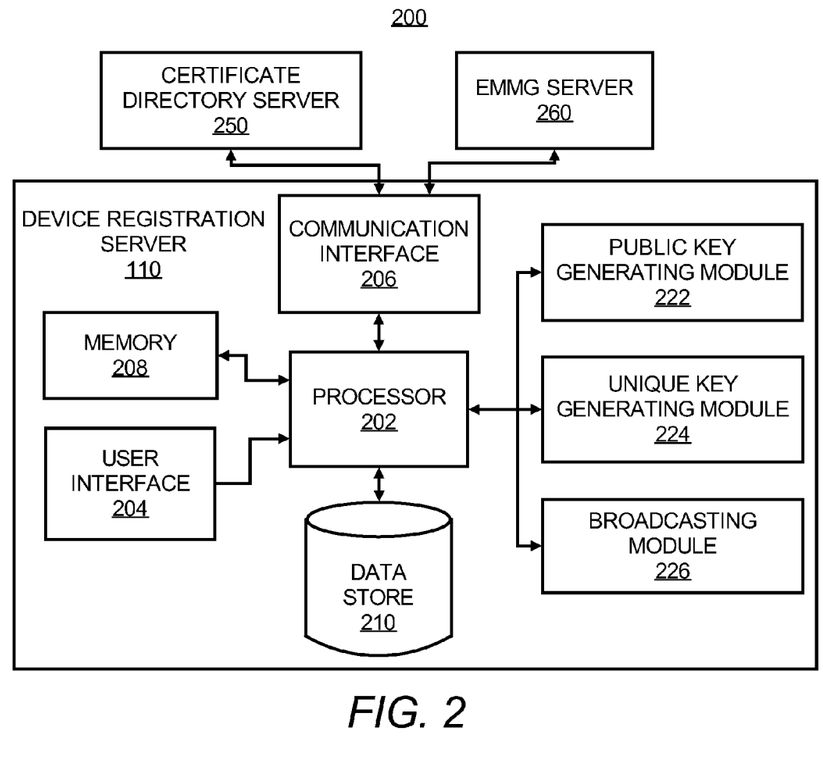
FIG. 2 shows a block diagram of a device registration server, according to an embodiment of the present invention.
Figure 3:
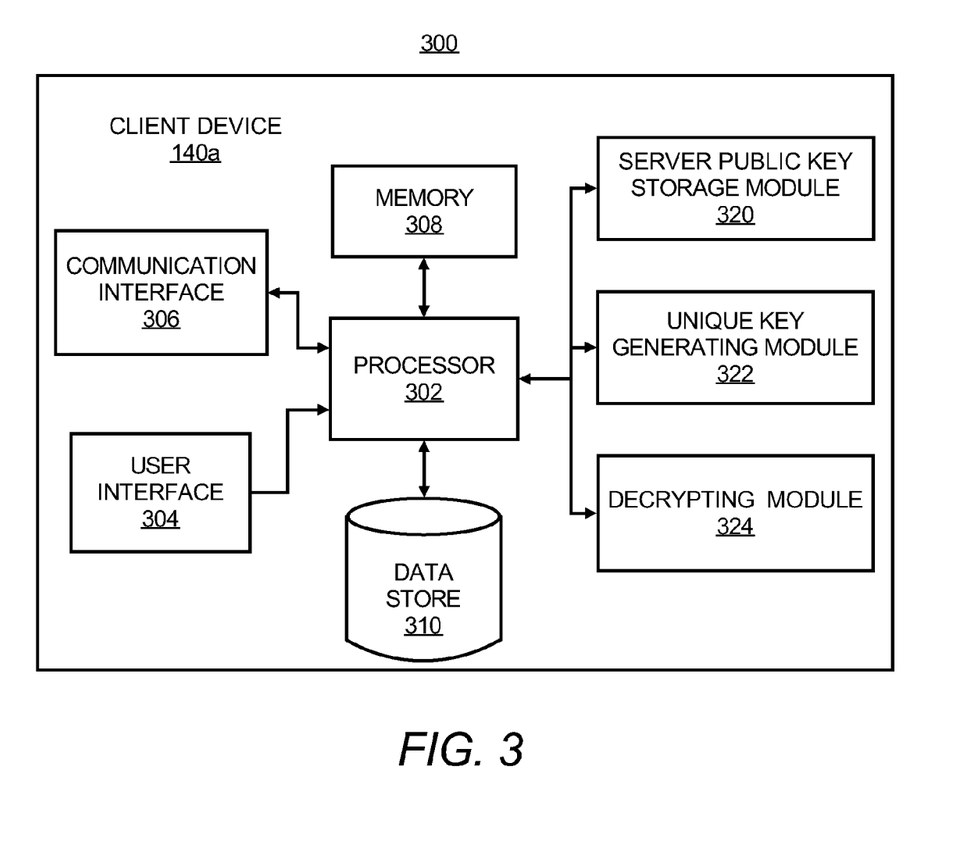
FIG. 3 shows a block diagram of a client device, according to an embodiment of the present invention.

With reference now to FIGS. 2 and 3, respectively, there are shown block diagrams 200 and 300 of a device registration server 110 and a client device 140a depicted in FIG. 1, according to embodiments of the invention. It should be apparent to those of ordinary skill in the art that the block diagrams 200 and 300 represents generalized illustration and that other components may be added or existing components may be removed, modified or rearranged without departing from scopes of the device registration server 110 and the client device 140a. In addition, it should be understood that the following description of the client device 140a is applicable to the other client devices 140b-140n.

As shown in FIG. 2, the device registration server 110 includes a processor 202, a user interface 204, a communication interface 206, a memory 208, a data store 210, a public key generating module 222, a unique key generating module 224, and a broadcasting module 226. As also shown in FIG. 2, the device registration server 110 is in communication with a certificate directory server 250 and an entitlement management message generator (EMMG) server 260, for instance, over a network (not shown), such as the Internet or an internal network. As shown in FIG. 3, the client device 140a includes a processor 302, a user interface 304, a communication interface 306, a memory 308, a data store 310, a server public key storage module 320, a unique key generating module 322, and a decrypting module 324.

The modules 222-226 and 320-324 may comprise software modules, hardware modules, or a combination of software and hardware modules. Thus, in one embodiment, one or more of the modules 222-226 and 320-324 comprise circuit components. In another embodiment, one or more of the modules 222-226 and 320-324 comprise software code stored on a computer readable storage medium, which are executable by one of the processors 202 and 302. In a further embodiment, the modules 222-226 and 320-324 may comprise a combination of hardware and software. In any regard, the functionalities of one or more of the modules 222-226 and 320-324 may be combined into a lesser number of modules 222-226 and 320-324 or separated into additional modules without departing from a scope of the invention.

The user interfaces 204 and 304 may comprise a set of keys, buttons, switches, audio receiver, and the like through which a user may enter inputs into the device registration server 110 and the client device 140a. The communication interfaces 206 and 306 may comprise suitable hardware and/or software to enable wireless communications with the client devices 140a-140n, as well as other apparatuses.

The memories 208 and 308 and the data stores 210 and 310 may comprise any reasonably suitable computer readable storage media, such as, RAM, ROM, EPROM, EEPROM, magnetic or optical disks or tapes, etc. The memories 208 and 308 may store respective programs or algorithms that define the functionalities of the processors 202 and 302. In this regard, in instances where the modules 222-226 and 320-324 comprise software modules, the modules 222-226 and 320-324 may respectively be stored as software on the memories 208 and 308. The data stores 210 and 310 may respectively store various information that the processors 202 and 302 may access in registering the client devices 140a-140n with the device registration server 110. As such, the data store 210 may store the private/public key pair of the device registration server 110. In addition, the data store 310 of the client device 140a may store the server public key either temporarily to generate a unique symmetric key or permanently after the unique symmetric key has been generated.

Various manners in which the components of the device registration server 110 and the client device 140a may be implemented are described in greater detail with respect to FIGS. 4-7. It should be apparent to those of ordinary skill in the art that FIGS. 4-7 represent generalized illustrations and that other steps or features may be added or existing steps or features may be removed, modified or rearranged without departing from scopes of the illustrations depicted in FIGS. 4-7.

The descriptions of FIGS. 4-7 are made with particular reference to the device registration server 110 and the client device 140a depicted in FIGS. 1-3 and thus makes particular reference to the elements contained therein. It should however, be understood that the illustrations depicted in FIGS. 4-7 may be implemented in apparatuses that differ from the device registration server 110 and the client device 140a without departing from scopes of FIGS. 4-7.

Figure 4:
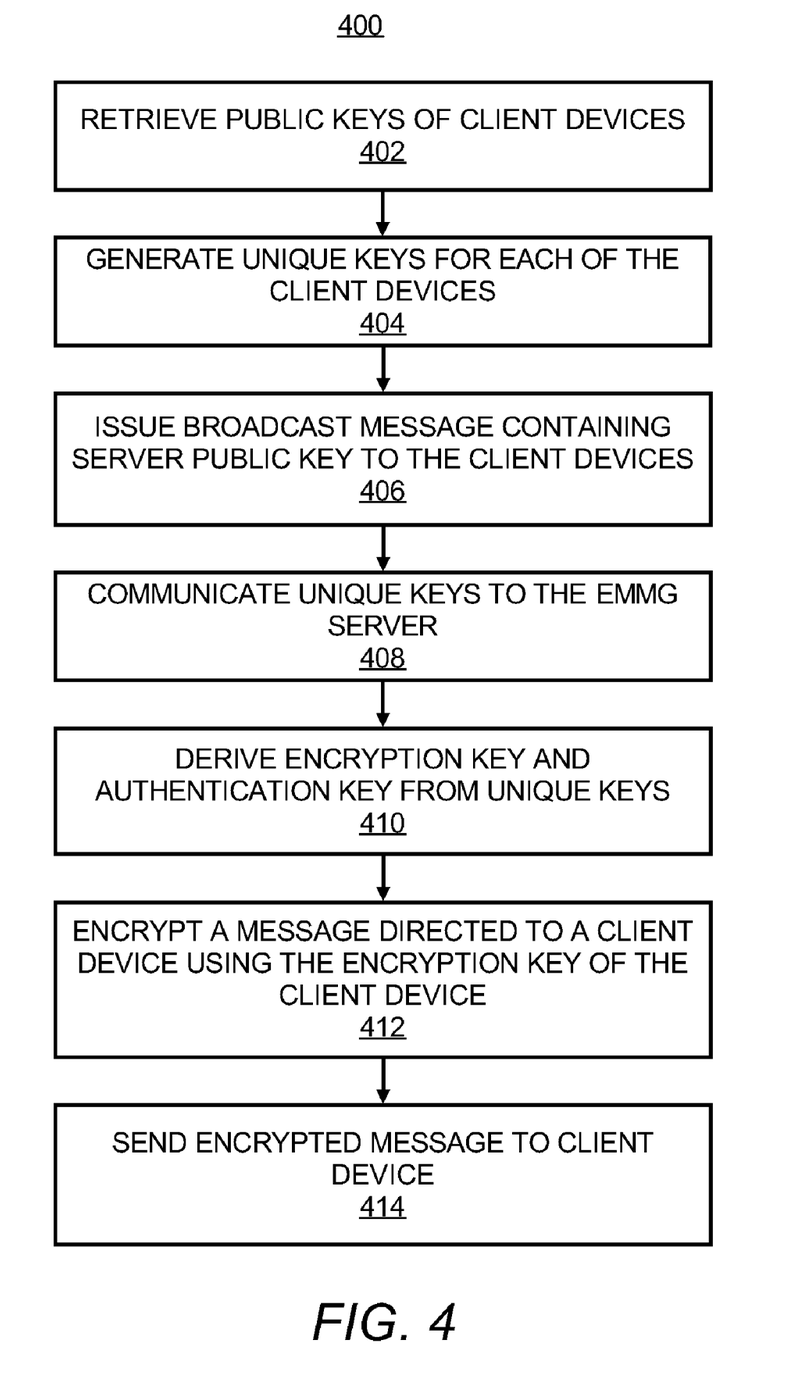
FIG. 4 illustrates a flow diagram of a method of registering a plurality of client devices with a device registration server for secure data communications there between, according to an embodiment of the present invention.

With reference first to FIG. 4, there is shown a diagram of a method 400 of registering a plurality of client devices 140a-140n with a device registration server 110 for secure data communications there between, according to an embodiment. As shown therein, at step 402, the public keys of the client devices 140a-140n are retrieved from the certificate directory server 250. By way of example, when the certificates of the client devices 140a-140n are first generated, for instance, when the client devices 140a-140n are first fabricated, the certificates are published to the certificate directory server 250 and may be available over the Internet. More particularly, for instance, the device registration server 110 submits a query to the certificate directory server 250 for the device public key certificate (or just the public key) based upon a specific identifier of the client device 140a as needed. In addition, the device registration server 110 receives each of the queried public keys in a form of a digital certificate having a digital signature of a Certificate Authority that is trusted by the device registration server 110.

At step 404, unique symmetric keys for each of the client devices 140a-140n are generated, for instance, by the unique key generating module 224 of the device registration server 110. Thus, for instance, the unique key generating module 224 is configured to generate a unique symmetric key for each of the client devices 140a-140n such that the unique symmetric key for one client device 140a differs from all of the other unique symmetric keys for the other client devices 140b-140n. In addition, the unique key generating module 224 is configured to generate the unique symmetric keys without using private keys of the client devices 140a-140n.

Figure 5:
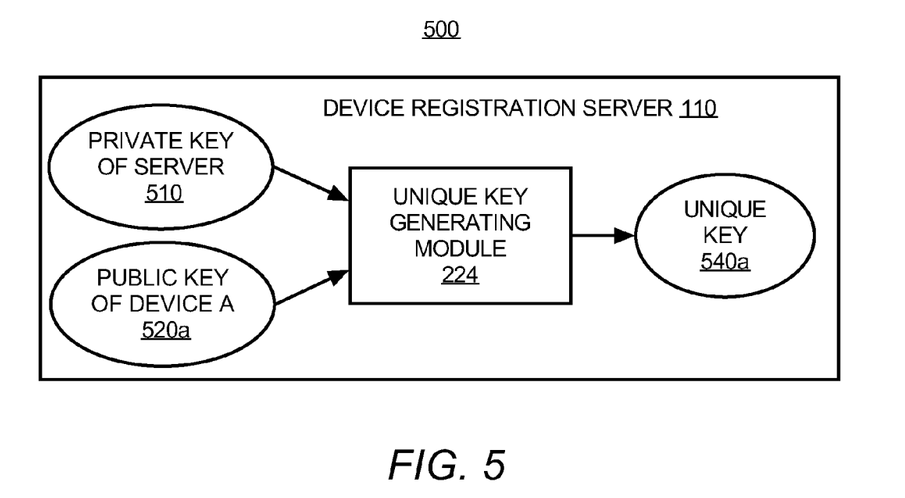
FIG. 5 shows a process diagram of a manner in which the unique key generating module of the device registration server generates a unique symmetric key for a client device, according to an embodiment of the present invention.

With reference now to FIG. 5, there is shown a process diagram 500 of a manner in which the unique key generating module 224 generates a unique symmetric key for a client device 140a, according to an embodiment. As shown therein, the unique key generating module 224 receives as inputs, the private key of the device registration server 510 and the public key of the client device A 520a. In addition, the unique key generating module 224 generates the unique symmetric key for the client device A 540a. According to an embodiment, the unique key generating module 224 generates the unique symmetric key 540a for the client device 140a using a cryptographic function.

Examples of suitable cryptographic functions include an Elliptic Curve Diffie-Hellman (ECDH) function or a Diffie-Hellman (DH) function. Thus, for instance, the unique key generating module 224 may input the private key of the device registration server 510 and the public key of the client device A 140a into either of the ECDH function or the DH function to generate the unique symmetric key 540a for the client device A 140a. Moreover, the unique key generating module 224 also generates unique symmetric keys 540b-540n for the remaining client devices 140b-140n through similar operations. By way of particular example in which the client device A 140a has a private key, x, and the device registration server 110 has a private key, y, the public key 520a of the client device A may be computed as:

Equation (1): $g^x \bmod p$, in which "g" represents a generator, which is the generating element in a finite cyclic group "G" and "p" represents a "Prime Number", which is the modulo.

In addition, the public key of the device registration server 110 is computed as:

Equation (2): $g^y \bmod p$, in which "g" also represents the same generator, which is the generating element in the finite cyclic group "G" and "p" also represents the "Prime Number", which is the modulo.

Moreover, in this example, the unique symmetric key 540a for the device registration server 110 may be generated from the public key 520a ($g^x \bmod p$) of the client device A and the private key 510 (y) of the device registration server 110 using the DH function as:

$$(g^x \bmod p)^y = g^{xy} \bmod p. \qquad \text{Equation (3):}$$

Figure 7:
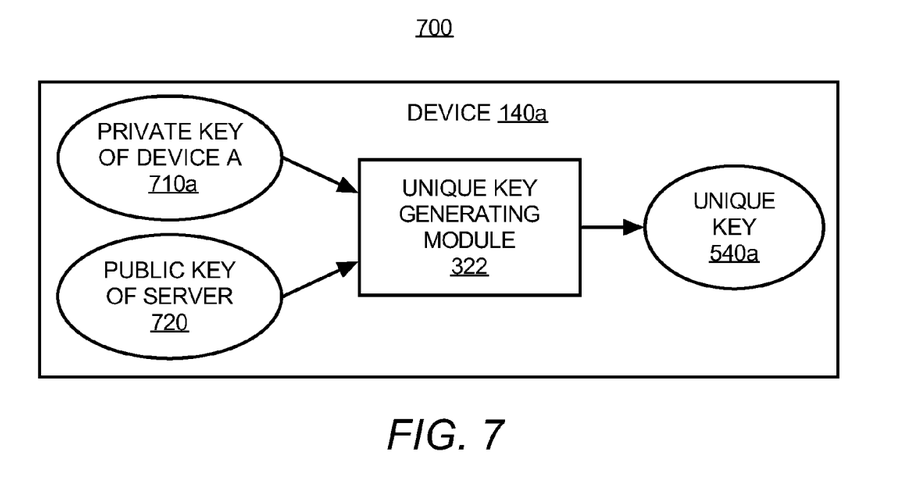
FIG. 7 shows a process diagram of a manner in which the unique key generating module of a client device generates a unique symmetric key for the client device, according to an embodiment of the present invention.

In addition, in this example, the unique symmetric key 540a for the device 140a may be generated from the public key 720 ($g^y \bmod p$) of the device registration server 110 and the private key 710a (x) of the device 140a using the DH function as:

$$(g^y \bmod p)^x = g^{xy} \bmod p. \qquad \text{Equation (4):}$$

As shown from the example above, both the device registration server 110 and the client devices 140a-140n are able to compute the same unique symmetric key. In one regard, ECDH can be used instead of DH and is generally preferred over DH because the public key size for ECDH is smaller with equivalent security strength, for example, a 256 byte DH public key may provide a similar level of security strength to a 32 byte ECDH public key.

With reference back to FIG. 4, at step 406, in order to register all the devices 140a-140n or change the unique key for each device, a common broadcast message containing the server public key is issued to the client devices 140a-140n, for instance, by the broadcasting module 226. According to an embodiment, the processor 202 may implement the public key generating module 222 to generate a new public/private key pair of the device registration server 110. According to another embodiment, a new public/private key pair may be generated in an external secure facility, such as a Certificate Authority, and then loaded into the server pubic key storage module 320. In addition, step 404 may be repeated to generate new unique symmetric keys 540a-540n based upon the new public/private key pair. In any regard, the device registration server 110 issues a common broadcast message to all of the client devices 140a-140n, in which the common broadcast message includes a current or a new public key of the device registration server 110.

More particularly, the device registration server 110 may issue a single common broadcast message to the client devices 140a-140n. In this regard, the amount of bandwidth required of the device registration server 110 in generating and communicating the broadcast message to the client devices 140a-140n is significantly smaller than the amount of bandwidth required by conventional servers in generating and communicating unit addressed broadcast messages to the client devices 140a-140n. This broadcast message contains the public key of the registration server that enables each client device 140a-140n to recalculate a new unique symmetric key for itself. In addition, the device registration server 110 may attach a digital signature to the broadcast message, which the client devices 140a-140n may use in verifying the authenticity of the source of the broadcast message.

In one embodiment, the broadcast message issued at step 406 is enclosed in a digital certificate that is signed by a Certificate Authority using its private key that is trusted by the client devices 140a-140n. More particularly, the registration server's digital certificate includes at least the public key of the device registration server 110 and a signature of a Certificate Authority that can be verified by each client device using the Certificate Authority's public key. The preferred format for digital certificates is X.509 as specified in the Internet Engineering Task Force (IETF) Request For Comments (RFC) 5280 or IETF RFC 5280. A digital certificate has the advantage of allowing each client device 140a-140n to verify that this is a legitimate registration server since its public key has been certified by a trusted Certificate Authority.

In an embodiment, the public key of each client device 140a-140n is provided in a form of a digital certificate and includes a signature of a Certificate Authority that can be verified by the device registration server 110 or other server. This digital certificate has the advantage of allowing the device registration server 110 to verify that it belongs to a legitimate device since its public key has been certified by a trusted Certificate Authority.

At step 408, the device registration server 110 communicates the unique symmetric keys 540a-540n generated at step 404 to the EMMG server 260. In addition, the EMMG server 260 derives respective encryption keys and authentication keys from the unique symmetric keys 540a-540n, as indicated at step 410. By way of example, the encryption keys may comprise 128-bit AES keys. In addition, the encryption keys and the authentication keys may be derived via one-way functions from the unique symmetric keys 540a-540n.

At step 412, an entitlement management message directed to a particular client device 140a is encrypted using the encryption key for that particular client device 140a, for instance, by the EMMG server 260. In addition, the EMMG server 260 may generate a symmetric message authentication code (MAC) using the authentication key for that particular client device 140a.

At step 414, the EMMG server 260 may send the encrypted entitlement management message and the symmetric MAC to the client device 140a.

As discussed in greater detail below, the client devices 140a-140n are configured to use an existing or a new public key of the device registration server 110 contained in the broadcast message to generate their own respective unique symmetric keys 540a-540n, which match the unique symmetric keys 540a-540n generated by the device registration server 110 for each of the client devices 140a-140n. In addition, the client devices 140a-140n are configured to use their respective unique symmetric keys 540a-540n to decrypt encrypted messages.

Figure 6:
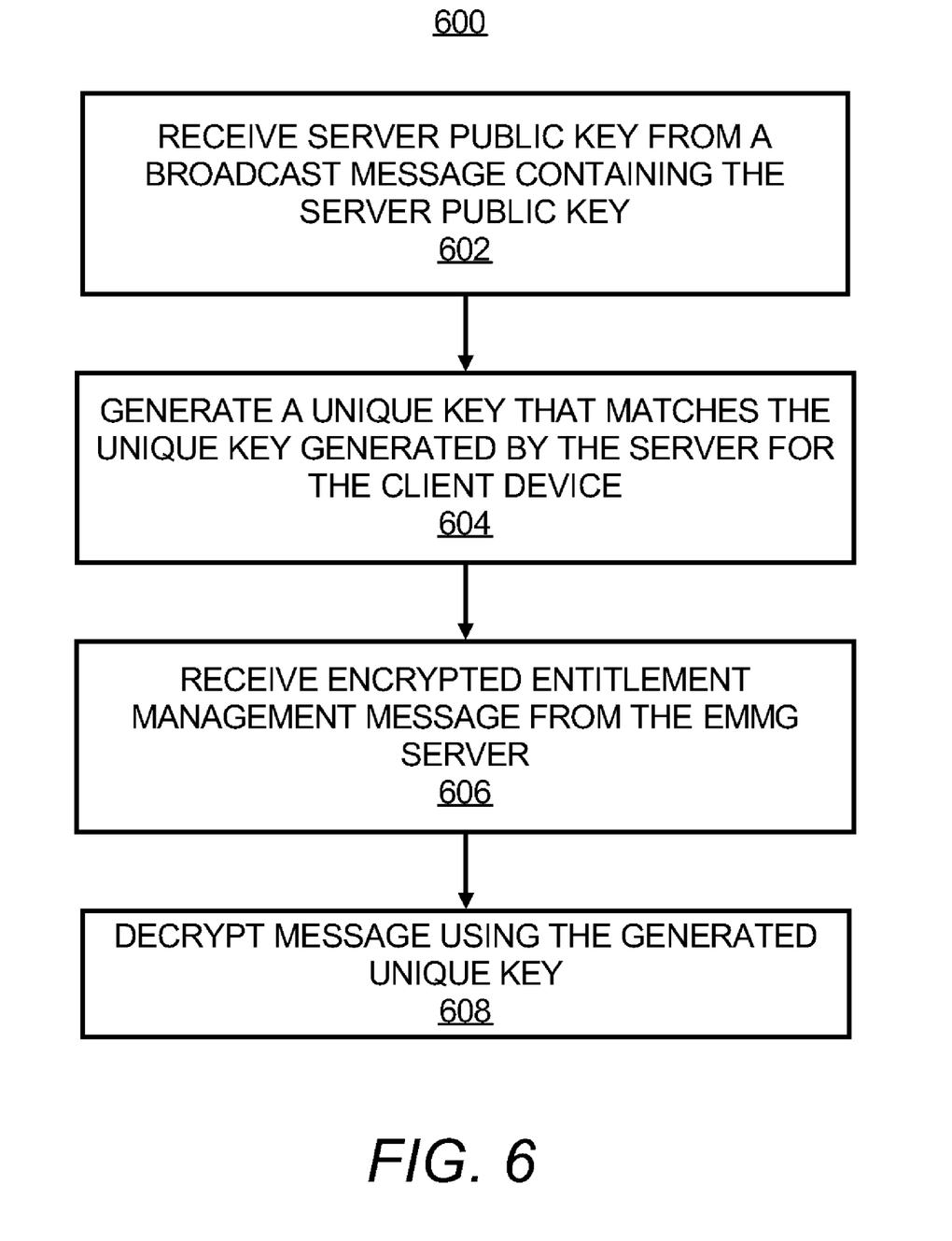
FIG. 6 shows a flow diagram of a method of decrypting encrypted entitlement management messages in a client device, according to an embodiment of the present invention.

With reference now to FIG. 6, there is shown a flow diagram of a method 600 of decrypting encrypted entitlement management messages in a client device, according to an embodiment of the invention. Although particular reference is made to an individual client device 140a, it should be understood that the steps contained in the method 600 are equally applicable to the other client devices 140b-140n.

As shown therein, at step 602, the client device 140a receives a broadcast message containing the public key of the device registration server 110 sent by the device registration server 110. In addition, the public key of the device registration server 110 may be stored, for instance, by the server public key storage module 320 in the data store 310. According to an embodiment, the client device 140a may store the public key of the device registration server 110 for a sufficient length of time to generate the unique symmetric key, and may discard or delete the public key of the device registration server 110 following the generation of the unique symmetric key. As discussed above, the public key received at step 602 may comprise an existing public key or a new public key issued in response to a security breach in either the device registration server 110 or one or more of the client devices 140a-140n.

At step 604, a unique symmetric key that matches the unique symmetric key generated by the device registration server 110 for the client device 140a is generated, for instance, by the unique key generating module 322 of the client device 140a. The unique key generating module 322 is configured to generate the unique symmetric key without using a private key of the device registration server 110.

With reference now to FIG. 7, there is shown a process diagram 700 of a manner in which the unique key generating module 322 generates a unique symmetric key for the client device 140a, according to an embodiment. As shown therein, the unique key generating module 322 receives as inputs, the private key of the client device 710a and the public key of the client registration server 720. In addition, the unique key generating module 322 generates the unique symmetric key for the client device 540a, which matches the unique symmetric key generated by the unique key generating module 224 in FIG. 5 for the client device 540a. According to an embodiment, the unique key generating module 322 generates the unique symmetric key 540a for the client device 140a using a cryptographic function.

Examples of suitable cryptographic functions include an Elliptic Curve Diffie-Hellman (ECDH) function or a Diffie-Hellman (DH) function. Thus, for instance, the unique key generating module 322 may input the private key of the client device 710a and the public key of the client registration server 720 into either of the ECDH function or the DH function to generate the unique symmetric key 540a for the client device A 140a. Thus, for instance, the unique key generating module 322 of the client device 140a may generate the unique symmetric key 540a for the client device 140a in the same manner as the unique key generating module 224 of the device registration server 110 discussed above.

With reference back to FIG. 6, an encrypted message is received, as indicated at step 606. At step 608, the unique symmetric key 540a generated at step 604 is used to decrypt the encrypted entitlement management message, for instance, by the decrypting module 324. More particularly, the decrypting module 324 may derive an encryption key and an authentication key from the unique symmetric key 540a and may use the derived encryption key and authentication key to decrypt and authenticate the encrypted entitlement management message. In this regard, the encryption key and the authentication key derived at step 608 would match the encryption key and the authentication key derived at step 410 (FIG. 4) by the device registration server 110.

In one regard, therefore both the device registration server 110 and the client devices 140a-140n may save the respective encryption keys and key authentication keys as unique symmetric key client identities and may use the respective authentication keys and the encryption keys each time a broadcast message needs to be uniquely addressed to individual client devices 140a-140n.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 8:
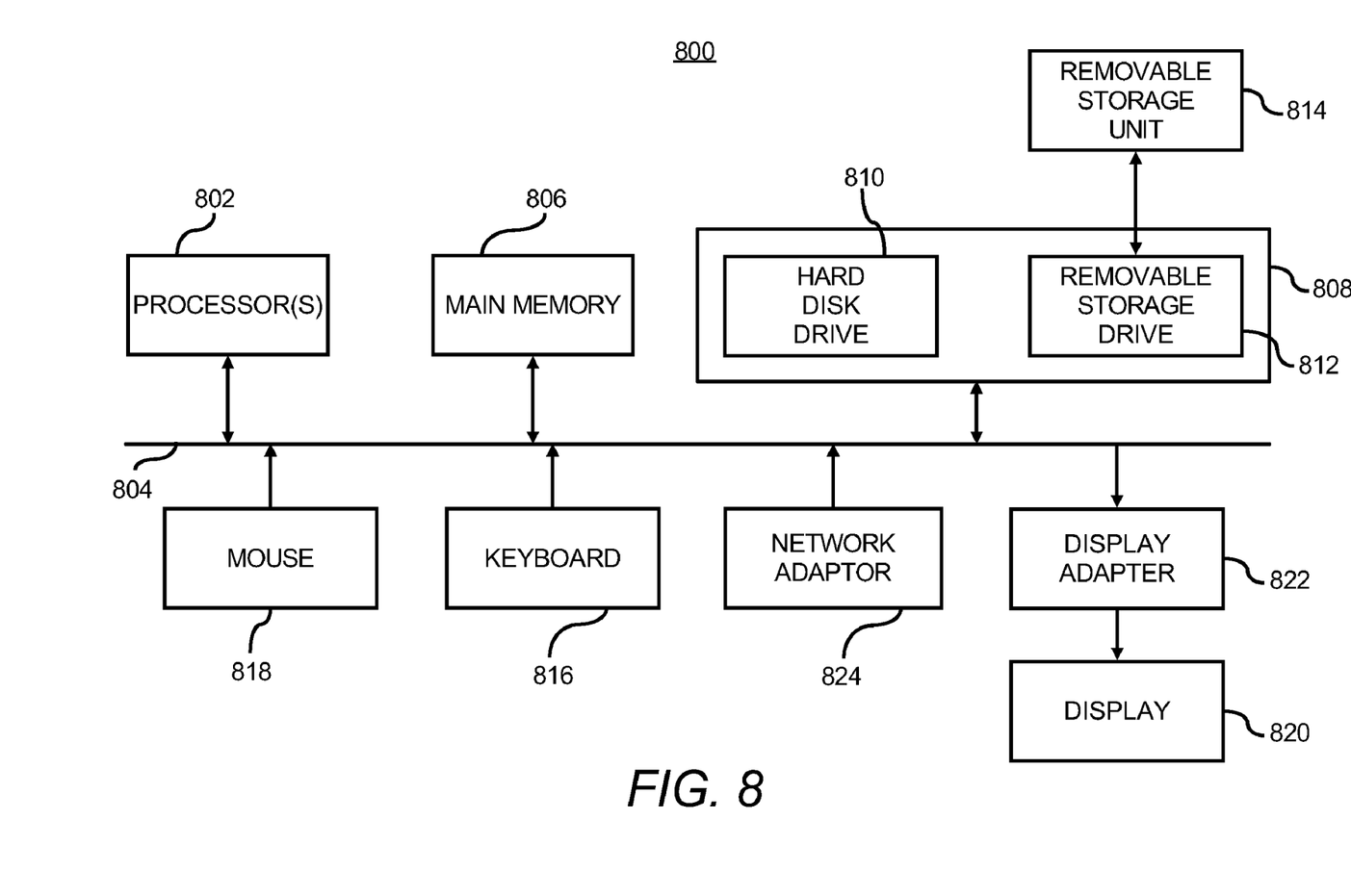
FIG. 8 shows a block diagram of a computer system configured to implement or execute one or more of the processes depicted in FIGS. 4 and 6, according to an embodiment of the present invention.

FIG. 8 illustrates a block diagram of a computing apparatus 800 configured to implement or execute one or more of the processes depicted in FIGS. 4 and 6, according to an embodiment. It should be understood that the illustration of the computing apparatus 800 is a generalized illustration and that the computing apparatus 800 may include additional components and that some of the components described may be removed and/or modified without departing from a scope of the computing apparatus 800.

Generally speaking, the computing apparatus 800 may comprise either of the device registration server 110 and the client devices 140*a*-140*n*. In this regard, the computing apparatus 800 may be considered as illustrating a more detailed depiction of the device registration server 110 and the client devices 140*a*-140*n*. The computing apparatus 800 includes a processor 802 that may implement or execute some or all of the steps described in one or more of the processes depicted in FIGS. 4 and 6 and may thus comprise either of the processors 202 and 302 depicted in FIGS. 2 and 3. Commands and data from the processor 802 are communicated over a communication bus 804. The computing apparatus 800 also includes a main memory 806 (208, 308), such as a random access memory (RAM), where the program code for the processor 802, may be executed during runtime, and a secondary memory 808 (210, 310). The secondary memory 808 includes, for example, one or more hard disk drives 810 and/or a removable storage drive 812, representing a floppy diskette drive, a magnetic tape drive, a compact disk drive, etc., where a copy of the program code for one or more of the processes depicted in FIGS. 4 and 6 may be stored.

The removable storage drive 810 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor 802 and convert the display data into display commands for the display 820. In addition, the processor(s) 802 may communicate over a network, for instance, the Internet, LAN, etc., through a network adaptor 824.

Through implementation of the method, device registration server, and client device disclosed herein, the amount of bandwidth required to communicate a device registration message to a plurality of devices in a network may substantially be reduced as compared with conventional approaches. More particularly, the device registration server generates unique symmetric keys for each of the client devices without using the private keys of client devices, and the client devices generate respective unique symmetric keys that match the respective unique symmetric keys generated by the device registration server for the client devices without using the private key of the device registration server. In one regard, therefore, the device registration server need only send a single common broadcast message to all of the client devices containing the server public key whenever a change in the client unique symmetric keys is required, such as, when security in the network has been compromised. One result of this ability is that the device registration server is not required to consume processing power to generate individual messages for each of the client devices. Another result is that the device registration server may send the common broadcast message to the client devices without consuming the relatively large amounts of bandwidth required for sending individual messages.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method of registering a plurality of client devices with a device registration server for secure data communications, said method comprising:

generating a unique symmetric key for each of the plurality of client devices using a cryptographic function on a private key of the device registration server and a respective public key of each of the plurality of client devices;

sending a broadcast message containing the public key of the device registration server to the plurality of client devices, wherein each of the plurality of client devices is configured to generate a respective unique symmetric key from the public key of the device registration server and its own private key using a cryptographic function, and wherein each of the unique symmetric keys generated by the client devices matches the respective unique symmetric key generated by the device registration server for the respective client device; and communicating the unique symmetric keys to an entitlement management message generator (EMMG) server, wherein the EMMG server is configured to derive an encryption key from each of the unique symmetric keys for each of the plurality of client devices and to encrypt an entitlement management message for a particular client device using the encryption key for that particular client device.

2. The method according to claim 1, wherein generating the unique symmetric key for each of the plurality of client devices using a cryptographic function further comprises generating the unique symmetric key for each of the plurality of client devices by applying at least one of an Elliptic Curve Diffie-Hellman (ECDH) and a Diffie-Hellman (DH) function on the private key of the device registration server and the respective public key of each of the plurality of client devices.

3. The method according to claim 1, further comprising:

receiving a list of the public keys of the plurality of client devices, wherein each of the public keys is in a form of a digital certificate having a digital signature of a Certificate Authority that is trusted by the device registration server.

4. The method according to claim 1, further comprising:

generating the respective unique symmetric key in each of the plurality of client devices by applying at least one of an Elliptic Curve Diffie-Hellman (ECDH) and a Diffie-Hellman (DH) function on the private key of the respective client device and the public key of the device registration server.

5. The method according to claim 1, further comprising: issuing a common broadcast message containing a new public key of the device registration server to the plurality of client devices, and wherein generating the respective unique symmetric key in each of the client devices further comprises generating the respective unique symmetric keys in each of the client devices from the new public key of the device registration server.

6. The method according to claim 1, wherein sending the broadcast message further comprises issuing a single common broadcast message containing the public key to the plurality of client devices.

7. The method according to claim 1, wherein sending the broadcast message further comprises sending the broadcast message in response to a determination that identification of at least one of the unique symmetric keys of the plurality of client devices has been compromised.

8. The method according to claim 1, wherein sending the broadcast message further includes enclosing the public key of the device registration server in a digital certificate that is signed using a Certificate Authority that is trusted by the client devices.

9. The method according to claim 1, wherein the EMMG server is further configured to derive an authentication key from the unique symmetric key for each of the plurality of client devices, to generate a symmetric message authentication code (MAC) using the authentication key for that particular client, to attach the symmetric MAC to the encrypted entitlement management message and to send the encrypted entitlement management message to the particular client device.

10. The method according to claim 1, further comprising:
in the particular client device,
receiving the encrypted entitlement management message; and
decrypting the encrypted entitlement management message using an encryption key derived from the unique symmetric key of the particular client device.

11. A device registration server configured to provide registration for a plurality of client devices associated with respective public keys, the device registration server comprising:
one or more modules configured to generate a unique symmetric key for each of the plurality of client devices using a cryptographic function on a private key of the device registration server and the respective public key of each of the plurality of client devices, and to send a broadcast message containing a public key of the device registration server to each of the plurality of client devices, and wherein each of the unique symmetric keys matches a respective unique symmetric key generated in each of the plurality of client devices;
wherein the one or more modules are further configured to communicate the unique symmetric keys to an entitlement management message generator (EMMG) server, wherein the EMMG server is configured to derive an encryption key from each of the unique symmetric keys for each of the plurality of client devices and to encrypt an entitlement management message for a particular client device using the encryption key for that particular client device; and
a processor configured to implement the one or more modules.

12. The device registration server according to claim 11, wherein the one or more modules are configured to generate the unique symmetric key for each of the plurality of client devices by applying at least one of an Elliptic Curve Diffie-Hellman (ECDH) and a Diffie-Hellman (DH) function on the private key of the device registration server and the respective public key of each of the plurality of client devices.

13. The device registration server according to claim 11, wherein the EMMG server is further configured to derive an authentication key from each of the unique symmetric keys for each of the plurality of client devices, to generate a symmetric message authentication code (MAC) using the authentication key of the particular client device, to attach the symmetric MAC to the encrypted entitlement management message and to send the encrypted entitlement management message to the particular client device.

14. A client device configured to become registered with a device registration server having a public key, the client device comprising:
one or more modules configured to receive a broadcast message containing the public key of the device registration server sent by the device registration server, to at least temporarily store the public key of the device registration server, and to generate a unique symmetric key using a cryptographic function on a private key of the client device and the public key of device registration server, wherein the unique symmetric key matches a unique symmetric key generated in the device registration server for the client device;
wherein the one or more modules are further configured to communicate the unique symmetric keys to an entitlement management message generator (EMMG) server, wherein the EMMG server is configured to derive an encryption key from each of the unique symmetric keys for each of the plurality of client devices and to encrypt an entitlement management message for a particular client device using the encryption key for that particular client device;
a processor configured to implement the one or more modules; and
a data store for at least temporarily storing the public key of the device registration server and the generated unique symmetric key.

15. The device according to claim 14, wherein the one or more modules are configured to generate the unique symmetric key by applying at least one of an Elliptic Curve Diffie-Hellman (ECDH) and a Diffie-Hellman (DH) function on the private key of the client device and the public key of the device registration server.

16. The device according to claim 14, wherein the one or more modules are configured to decrypt an encrypted entitlement management message received from an entitlement management message generator server through use of encryption key derived from the generated unique symmetric key.

17. A non-transitory computer readable storage medium on which is embedded one or more computer programs, said one or more computer programs implementing a method of registering a plurality of client devices with a device registration server for secure data communications, said one or more computer programs comprising a set of instructions for:
generating a unique symmetric key for each of the plurality of client devices using a cryptographic function on a private key of the device registration server and a respective public key of each of the plurality of client devices;

sending a broadcast message containing the public key of the device registration server to the plurality of client devices, wherein each of the plurality of client devices is configured to generate a respective unique symmetric key from the public key of the device registration server and its own private key using a cryptographic function, and wherein each of the unique symmetric keys generated by the client devices matches the respective unique symmetric key generated by the device registration server for the respective client devices; and communicating the unique symmetric keys to an entitlement management message generator (EMMG) server, wherein the EMMG server is configured to derive an encryption key from each of the unique symmetric keys for each of the plurality of client devices and to encrypt an entitlement management message for a particular client device using the encryption key for that particular client device.

18. The non-transitory computer readable storage medium according to claim 17, said one or more computer programs further comprising a set of instructions for:

generating the unique symmetric key for each of the plurality of client devices by applying at least one of an Elliptic Curve Diffie-Hellman (ECDH) and a Diffie-Hellman (DH) function on the private key of the device registration server and the respective public key of each of the plurality of client devices.

* * * * *